US009643648B2

(12) United States Patent
Boyle et al.

(10) Patent No.: US 9,643,648 B2
(45) Date of Patent: *May 9, 2017

(54) SINGLE PEDAL PROPULSION SYSTEM FOR STRAIGHT TRAVEL OF WORK VEHICLE

(71) Applicant: Deere & Company, Moline, IL (US)

(72) Inventors: Michael J. Boyle, Bettendorf, IA (US); Justin R. Shook, Winston Salem, NC (US); Mark K. Wall, Eldridge, IA (US); Jeffrey A. Friebel, Kernersville, NC (US)

(73) Assignee: Deere & Company, Moline, IL (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/797,385

(22) Filed: Jul. 13, 2015

(65) Prior Publication Data

US 2015/0315769 A1 Nov. 5, 2015

Related U.S. Application Data

(63) Continuation of application No. 13/690,170, filed on Nov. 30, 2012, now Pat. No. 9,108,675.

(51) Int. Cl.
*B62D 6/00* (2006.01)
*B62D 11/02* (2006.01)
(Continued)

(52) U.S. Cl.
CPC ............ *B62D 11/02* (2013.01); *B62D 11/005* (2013.01); *B62D 11/04* (2013.01); *B62D 11/06* (2013.01); *E02F 9/225* (2013.01); *F16D 1/00* (2013.01)

(58) Field of Classification Search
CPC ...... B62D 55/065; B62D 55/084; B62D 5/08; B62D 11/001; B62D 11/005
(Continued)

(56) References Cited

U.S. PATENT DOCUMENTS 3,064,434 A  11/1962 Parrett
3,494,449 A  2/1970 Umeda et al.
(Continued)

FOREIGN PATENT DOCUMENTS

CN  101758780    6/2010
CN  102099533 A  6/2011
(Continued)

OTHER PUBLICATIONS

JustAnswer.com Discussion Forum, "View of Steering and Brake System in Straight Forward," available at http:f/www.justanswer.com/heavy-equipment/2uwac-dozer-trouble-steering-rebuilt-steering-valves.html, 1 page, post dated Jan. 13, 2010, available online at least as early as Nov. 6, 2012.

(Continued)

*Primary Examiner* — Joseph Rocca
*Assistant Examiner* — Conan Duda
(74) *Attorney, Agent, or Firm* — Kilpatrick Townsend & Stockton, LLP (57) ABSTRACT

A work vehicle is disclosed with a propulsion system that is selectively operable in a first, turning mode or a second, straight mode. The vehicle includes a first traction device, a second traction device, a first steering input, and a second steering input. In the first, turning mode, an operator is able to steer the vehicle left, right, or straight by independently operating the first and second traction devices via the first and second steering inputs. In the second, straight mode, the operator is able to steer the vehicle straight by operating both the first and second traction devices together via one of the first and second steering inputs.

17 Claims, 7 Drawing Sheets

(51) Int. Cl.
*B62D 11/06* (2006.01)
*B62D 11/00* (2006.01)
*B62D 11/04* (2006.01)
*E02F 9/22* (2006.01)
*F16D 1/00* (2006.01)

(58) Field of Classification Search
USPC ......... 180/6.2, 6.3, 315, 321, 322, 323, 400, 180/403, 417, 419, 442
See application file for complete search history.

(56) References Cited

U.S. PATENT DOCUMENTS

| | | | |
|---|---|---|---|
| 4,140,144 | A | 2/1979 | Dowd et al. |
| 4,494,621 | A | 1/1985 | Nagata |
| 4,539,863 | A | 9/1985 | Kaukaskie |
| 5,186,295 | A | 2/1993 | Frisbee et al. |
| 5,513,107 | A * | 4/1996 | Gormley ............ B60G 17/0195 180/287 |
| 5,553,992 | A | 9/1996 | Ashcroft |
| 5,752,578 | A | 5/1998 | Kellogg |
| 6,289,783 | B1 | 9/2001 | Sagaser et al. |
| 6,389,922 | B1 | 5/2002 | Krieger |
| 6,863,144 | B2 | 3/2005 | Brandt et al. |
| 7,849,941 | B2 | 12/2010 | Bares et al. |
| 7,954,592 | B2 | 6/2011 | Miyazaki et al. |
| 8,028,787 | B2 | 10/2011 | Akahane et al. |
| 8,046,134 | B2 | 10/2011 | Huang et al. |
| 8,827,025 | B2 * | 9/2014 | Hapka ................. B60K 23/04 180/233 |
| 2002/0074179 | A1 | 6/2002 | Brandt et al. |
| 2003/0136603 | A1 | 7/2003 | Parghi |
| 2004/0129480 | A1 * | 7/2004 | Williams ............. B60R 25/02 180/287 |
| 2005/0203684 | A1 * | 9/2005 | Borgesson ........... B60K 35/00 701/36 |
| 2005/0207897 | A1 | 9/2005 | Kim |
| 2006/0180375 | A1 * | 8/2006 | Wierzba ............... B62D 7/142 180/253 |
| 2008/0083570 | A1 | 4/2008 | Bares et al. |
| 2008/0196947 | A1 | 8/2008 | Brazier |
| 2008/0289325 | A1 | 11/2008 | Lee |
| 2009/0166101 | A1 * | 7/2009 | Wenger ................. B62D 5/063 180/6.7 |
| 2009/0308669 | A1 | 12/2009 | Vos et al. |
| 2010/0049410 | A1 * | 2/2010 | McKee ................ G05B 19/409 701/50 |
| 2010/0106373 | A1 | 4/2010 | Scheer |
| 2010/0219004 | A1 | 9/2010 | Mackenzie |
| 2011/0108350 | A1 | 5/2011 | Sewell et al. |
| 2011/0315459 | A1 * | 12/2011 | Zuchoski ............ B60W 50/082 180/9.21 |
| 2013/0175105 | A1 | 7/2013 | Gallazzini |

FOREIGN PATENT DOCUMENTS

| | | |
|---|---|---|
| FR | 2552568 | 3/1985 |
| GB | 1393747 | 5/1975 |
| JP | 4138939 | 5/1992 |
| JP | 6087420 | 3/1994 |
| JP | 2001097069 | 4/2001 |
| JP | 2004196300 | 7/2004 |
| JP | 2005022454 | 1/2005 |
| JP | 2005160289 | 6/2005 |

OTHER PUBLICATIONS

Caterpillar, 963C Track Loader Brochure, 28 pages, Copyright 2005.
U.S. Appl. No. 13/690,170 , Non-Final Office Action mailed Aug. 4, 2004.
U.S. Appl. No. 13/690,170 , Final Office Action mailed Feb. 26, 2015.

* cited by examiner

SINGLE PEDAL PROPULSION SYSTEM FOR STRAIGHT TRAVEL OF WORK VEHICLE

RELATED APPLICATIONS

This application is a continuation of co-pending U.S. patent application Ser. No. 13/690,170, filed Nov. 30, 2012 and titled "SINGLE PEDAL PROPULSION SYSTEM FOR STRAIGHT TRAVEL OF WORK VEHICLE," the entirety of which is hereby incorporated by reference.

FIELD OF THE INVENTION

The present disclosure relates to a propulsion system for a work vehicle. More particularly, the present disclosure relates to a single pedal propulsion system for straight travel of a work vehicle, and to a method for using the same.

BACKGROUND

Work vehicles, such as excavators, may be equipped with a left foot pedal to command movement of a left track and a right foot pedal to command movement of a right track. To turn the excavator, an operator presses down on the left foot pedal more than the right foot pedal, or vice versa. To drive the excavator along a straight path, the operator must press down on the left foot pedal the same as the right foot pedal and hold both foot pedals in the same position, which is difficult and uncomfortable.

Some excavators may be equipped with an additional, third foot pedal that is dedicated to straight travel. However, the third foot pedal may take up valuable space near the floor of the excavator. Also, the third foot pedal may interfere with the operator's view from the excavator. Additionally, purchasing, installing, and connecting the third foot pedal and its associated hardware (e.g., hydraulic hoses) would require extra time and money.

SUMMARY

The present disclosure provides a work vehicle having a propulsion system that is selectively operable in a first, turning mode or a second, straight mode. The vehicle includes a first traction device, a second traction device, a first steering input, and a second steering input. In the first, turning mode, an operator is able to steer the vehicle left, right, or straight by independently operating the first and second traction devices via the first and second steering inputs. In the second, straight mode, the operator is able to steer the vehicle straight by operating both the first and second traction devices together via one of the first and second steering inputs.

According to an embodiment of the present disclosure, a work vehicle is provided that is selectively operable in a first steering mode and a second steering mode. The work vehicle includes a chassis, a first traction device supporting the chassis, a second traction device supporting the chassis, a first steering input device that controls movement of the first traction device in the first steering mode, and a second steering input device that controls movement of the second traction device in the first steering mode and that controls movement of the first and second traction devices in the second steering mode.

According to another embodiment of the present disclosure, a work vehicle is provided including a chassis, at least one left traction device supporting the chassis, at least one right traction device supporting the chassis, a left steering input device, a right steering input device, and a mode selector for switching between a first steering mode and a second steering mode. In the first steering mode, the at least one left traction device is operated by the left steering input device and the at least one right traction device is operated by the right steering input device to steer the work vehicle straight, left, and right. In the second steering mode, the at least one left traction device and the at least one right traction device are operated together by one of the left steering input device and the right steering input device to steer the work vehicle straight using only that one steering input device.

According to yet another embodiment of the present disclosure, a method is provided for operating a work vehicle, the work vehicle including a chassis, a first traction device supporting the chassis, and a second traction device supporting the chassis. The method includes the steps of: steering the work vehicle left or right by operating at least one of a first steering input device and a second steering input device, the first steering input device controlling movement of the first traction device and the second steering input device controlling movement of the second traction device; and steering the work vehicle straight by operating only the second steering input device, the second steering input device controlling movement of the first and second traction devices.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1A:
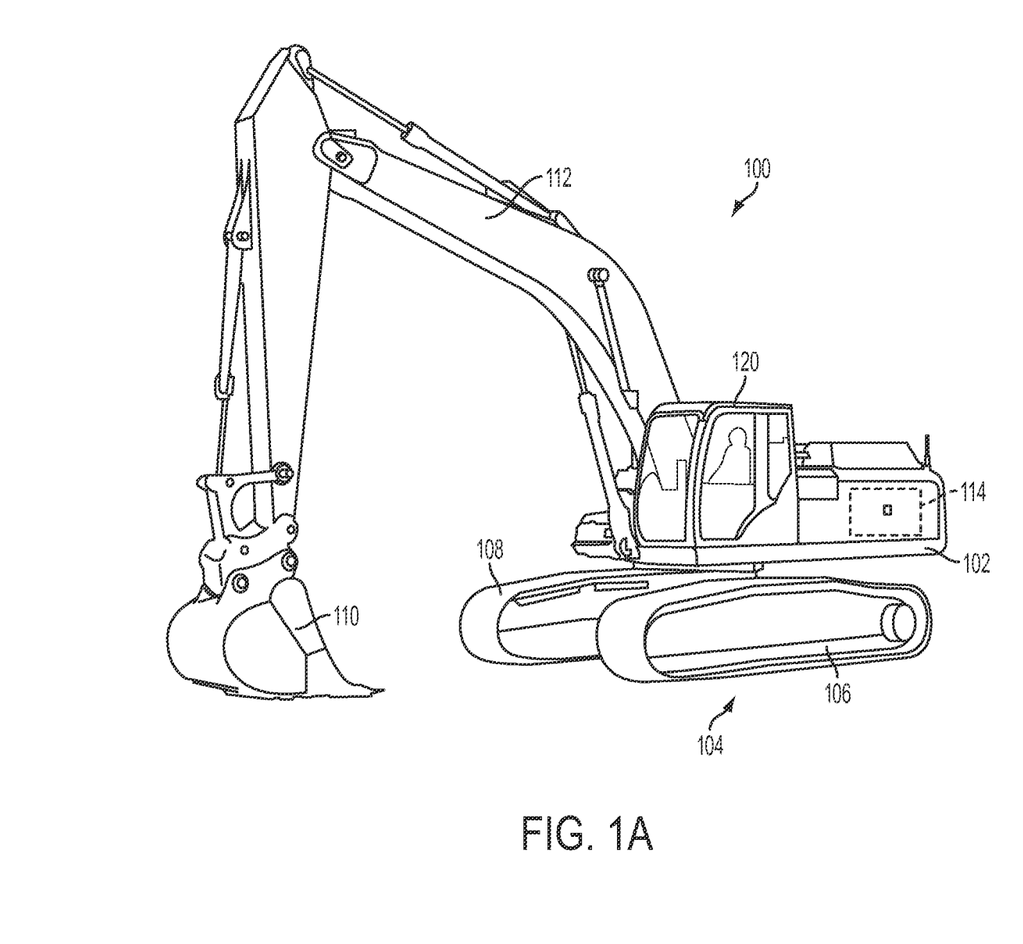
FIG. 1A is a front perspective view of a work vehicle in the form of an excavator, the excavator including a chassis, a left traction device, a right traction device, a work tool, and an operator cab.

Referring initially to FIG. 1A, a work vehicle 100 is provided in the form of an excavator. Although vehicle 100 is illustrated and described herein as an excavator, vehicle 100 may also be in the form of a loader, a bulldozer, a motor grader, or another construction, agricultural, or utility vehicle, for example.

Vehicle 100 includes chassis 102. Vehicle 100 also includes a propulsion system 104 for propelling chassis 102 across the ground. Propulsion system 104 illustratively includes at least one left traction device 106 and at least one right traction device 108 that support chassis 102 on the ground. In FIG. 1A, traction devices 106, 108 are in the form of tracks, but it is also within the scope of the present disclosure that traction devices 106, 108 may be in the form of wheels, for example. Propulsion system 104 may also include an engine 114 (shown in phantom in FIG. 1A) and a transmission (not shown) that communicate with traction devices 106, 108 to drive traction devices 106, 108, thereby propelling chassis 102 across the ground.

Vehicle 100 also includes at least one work tool, illustratively a front-mounted bucket 110. Bucket 110 is moveably coupled to chassis 102 via boom assembly 112 for scooping, carrying, and dumping dirt and other materials. Other suitable work tools include, for example, blades, forks, tillers, and mowers.

Figure 1B:
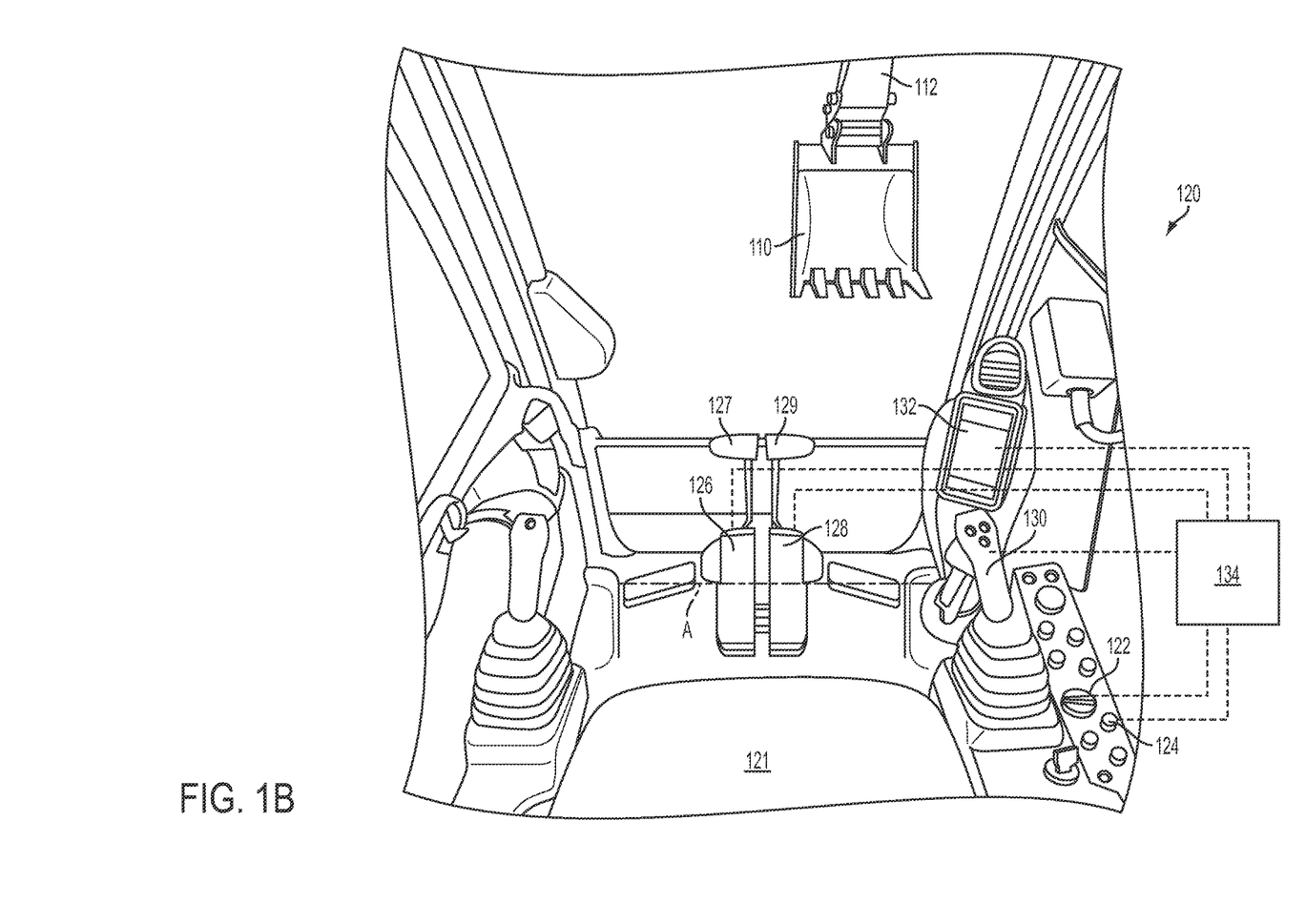
FIG. 1B is a forward facing perspective view from the operator cab of FIG. 1A.

Vehicle 100 further includes an operator cab 120 supported by chassis 102 to house and protect the operator of vehicle 100, as shown in FIG. 18. Operator cab 120 may include a seat 121 and various controls or user inputs for operating vehicle 100. In the illustrated embodiment of FIG. 18, operator cab 120 includes a speed input 122 and a steering input 124, which may be in the form of buttons, switches, or dials, for example. The operator may manipulate speed input 122 to set the operating speed of engine 114 (FIG. 1A) at either a first, low speed setting or a second, high speed setting. Other intermediate speed settings for engine 114 between the low and high speed settings may also be selected with speed input 122. In addition to controlling the speed of engine 114 with speed input 122, other speed inputs may also be provided to control the speed of the traction motors (not shown) coupled to traction devices 106, 108, for example. The operator may manipulate steering input 124 to select either a first, turning mode or a second, straight mode, both of which are described further below.

Operator cab 120 of FIG. 1B also includes a left steering input device 126, illustratively a left foot pedal, and a right steering input device 128, illustratively a right foot pedal. The operator may use the left and right foot pedals 126, 128 to control the travel speed of traction devices 106, 108 (FIG. 1A) by moving the left and right foot pedals 126, 128 by a desired distance. For a given operation, the operator may designate a desired speed for the engine 114 (FIG. 1A) and a desired speed for the traction motors (not shown) via one or more speed inputs 122, and then the operator may fine-tune or adjust the travel speed of vehicle 100 using the left and right foot pedals 126, 128. The operator may also use the left and right foot pedals 126, 128 to control the travel direction of traction devices 106, 108 (FIG. 1A) by moving the left and right foot pedals 126, 128 in a desired direction, such as either forward or backward about axis A, for example. The operator may command forward movement of vehicle 100 by pressing a desired foot pedal 126, 128 forward about axis A (e.g., by applying pressure with the ball of the operator's foot), and may command rearward movement of vehicle 100 by pressing a desired foot pedal 126, 128 backward about axis A (e.g., by applying pressure with the heel of the operator's foot). Foot pedals 126, 128 are illustratively V-shaped to facilitate this forward and backward movement. In FIG. 1B, the left and right foot pedals 126, 128 are mechanically coupled to left and right hand pedals 127, 129, respectively, for movement therewith. In this embodiment, the operator may command movement of vehicle 100 by moving a desired foot pedal 126, 128, or the corresponding hand pedal 127, 129.

Operator cab 120 of FIG. 1B further includes one or more joysticks 130 for controlling bucket 110 and boom assembly 112. Operator cab 120 of FIG. 1B still further includes a monitor 132 to display various gauges and operating conditions of vehicle 100. The various input and output devices 122, 124, 126, 127, 128, 129, 130, 132 in operator cab 120 may communicate with a vehicle controller 134 (shown schematically in FIG. 18).

As discussed above, steering input 124 may be used to select either a first, turning mode or a second, straight mode. Monitor 132 inside operator cab 120 may display or otherwise communicate the selected steering mode to the operator. Vehicle 100 may default to the first, turning mode. For example, if vehicle 100 is in the second, straight mode when powered off, vehicle 100 may reset to the first, turning mode upon restart.

Figure 2A:
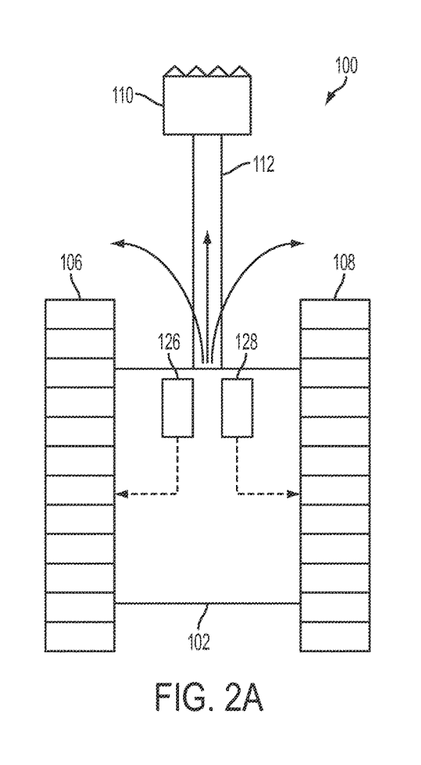
FIG. 2A is a schematic view showing the excavator of FIG. 1A operating in a first, turning mode.

In the first, turning mode, which is shown schematically in FIG. 2A, the operator is able to steer vehicle 100 right or left. The operator may press left foot pedal 126 to operate left traction device 106, and the operator may press right foot pedal 128 to independently operate right traction device 108. As mentioned above, the movement of each foot pedal 126, 128 may control the speed of each individual traction device 106, 108 to allow for steering. For example, if the operator presses left foot pedal 126 down farther than right foot pedal 128, left traction device 106 may turn faster than right traction device 108, causing vehicle 100 to turn right. By contrast, if the operator presses right foot pedal 128 down farther than left foot pedal 126, right traction device 108 may turn faster than left traction device 106, causing vehicle 100 to turn left. It is also within the scope of the present disclosure that the operator may steer vehicle 100 straight in the first mode, such as by pressing down left foot pedal 126 the same as right foot pedal 128 so that left and right traction devices 106, 108 turn at the same speed.

Figure 2B:
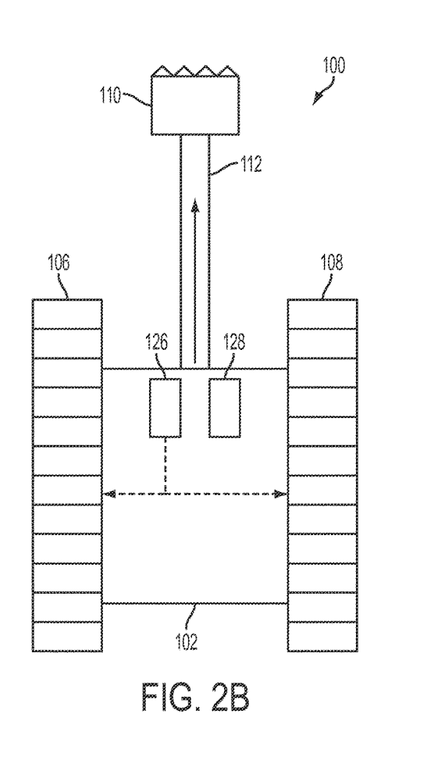
FIG. 2B is a schematic view similar to FIG. 2A showing the excavator operating in a second, straight mode.

In the second, straight mode, which is shown schematically in FIG. 2B, the operator is able to steer vehicle 100 straight using either left foot pedal 126 or right foot pedal 128. In the illustrated embodiment of FIG. 2B, the operator may press left foot pedal 126 to turn both the left and right traction devices 106, 108 together at the same speed. In another embodiment, the operator may press right foot pedal 128 to turn both the left and right traction devices 106, 108 together at the same speed. One or both foot pedals 126, 128 may be enabled in the second, straight mode to communicate with traction devices 106, 108. In embodiments where only one of the foot pedals (e.g., left foot pedal 126) is enabled, the other foot pedal (e.g., right foot pedal 128) may be disabled or disconnected from traction devices 106, 108, as shown in FIG. 2B.

The present disclosure allows vehicle 100 to be driven along a straight path using existing foot pedals 126, 128, without requiring installation of a third foot pedal that is dedicated to straight travel. Advantageously, the present disclosure conserves space in operator cab 120. The present disclosure also maximizes the operator's view from operator cab 120, as shown in FIG. 1B, without interference from such a third foot pedal. The present disclosure also saves time and costs that would be required to purchase, install, and connect such a third foot pedal and its associated hardware (e.g., hydraulic hoses).

After operating vehicle 100 in the second, straight mode, vehicle 100 may be returned to the first, turning mode by moving steering input 124 accordingly. Vehicle 100 may also be returned to the first, turning mode by pressing a disabled pedal. For example, pressing an enabled, left foot pedal 126 may cause vehicle 100 to drive straight in the second, straight mode, while pressing a disabled, right foot pedal 128 may cause vehicle 100 to return to the first, turning mode.

Figure 3:
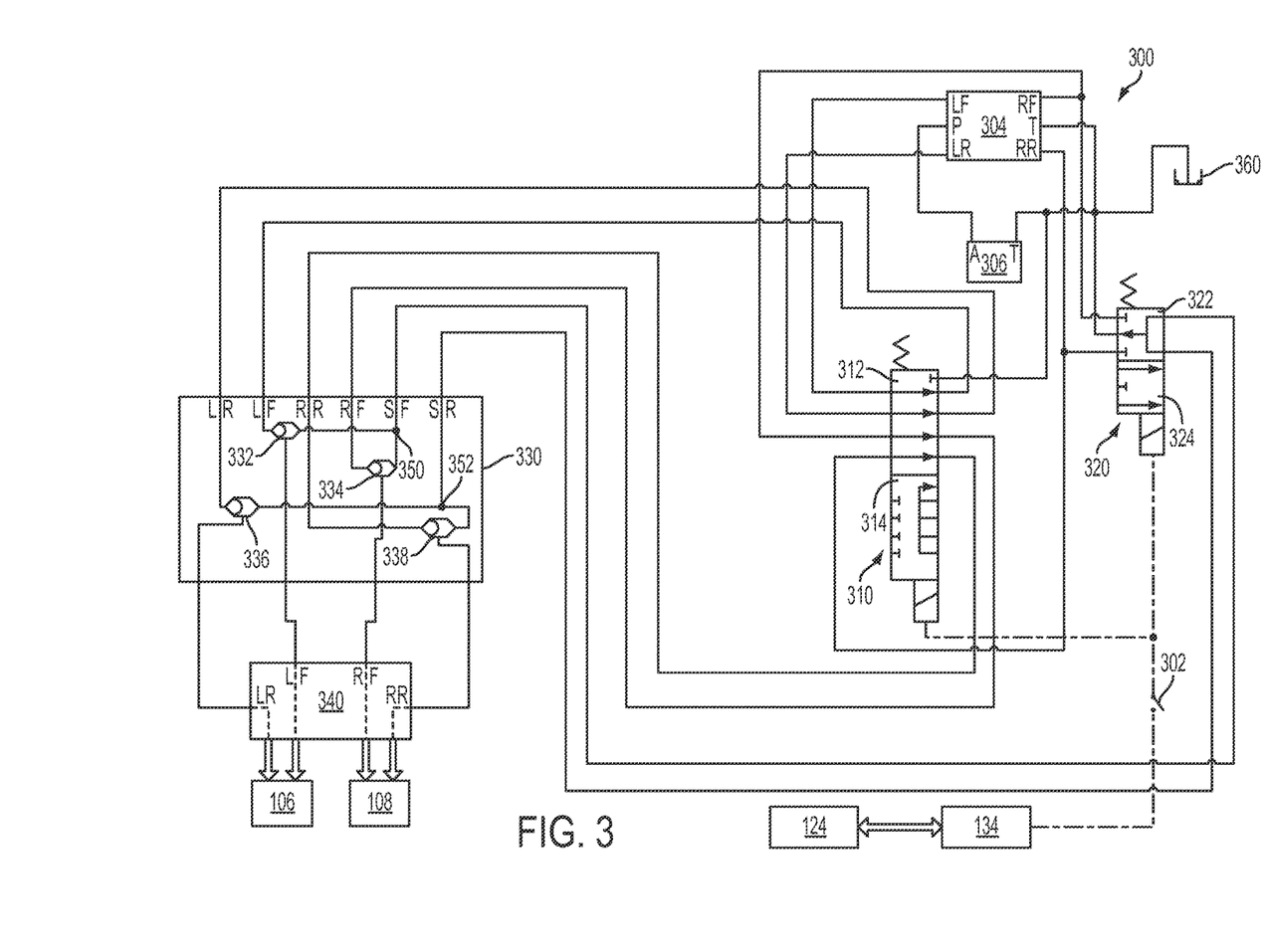
FIG. 3 is a schematic view of a first exemplary hydraulic circuit for operating the excavator of FIG. 1A.

Referring next to FIG. 3, a first exemplary hydraulic circuit 300 is provided to operate vehicle 100 (FIG. 1A). Circuit 300 includes a steering mode switch 302, a pilot valve 304, a shut-off valve 306 in communication with pilot valve 304, a first directional control valve 310 having a first neutral position 312 and a second position 314, a second directional control valve 320 having a first neutral position 322 and a second position 324, a distribution valve 330 having a plurality of shuttle valves 332, 334, 336, 338, a pilot signal manifold 340 in communication with left and right traction devices 106, 108, and a tank 360. An exemplary distribution valve 330 is a Vickers AT170459 valve available from Eaton Corporation of Cleveland, Ohio.

In FIG. 3, steering input 124 is selectively electrically coupled to solenoid-operated first and second directional control valves 310, 320 via vehicle controller 134 (see also FIG. 1B) and steering mode switch 302. In this embodiment, the first and second directional control valves 310, 320 are selectively activated by electrical signals from controller 134. It is also within the scope of the present disclosure that the first and second directional control valves 310, 320 may be activated by hydraulic signals, or a combination of electrical and hydraulic signals. For example, an electrical signal from controller 134 may be sent to an intermediate pilot valve (not shown), and the intermediate pilot valve may generate hydraulic pilot pressure signals that activate the first and second directional control valves 310, 320.

When steering input 124 is in the first, turning mode, switch 302 is open to leave first and second directional control valves 310, 320 in their neutral positions 312, 322, respectively (as shown in FIG. 3). First directional control valve 310 will be open to incoming fluid from pilot valve 304, while second directional control valve 320 will be closed to incoming fluid from pilot valve 304. The flow of hydraulic fluid through circuit 300 in the first, turning mode is described below based on the operator's movement of left and right foot pedals 126, 128.

Left-Forward (LF): When the operator presses left foot pedal 126 in a forward direction (FIG. 113), hydraulic fluid will flow from the LF port of pilot valve 304, through first directional control valve 310, to the LF port of distribution valve 330, past shuttle valve 332, and finally to the LF of pilot signal manifold 340, which will command forward travel of the corresponding left traction device 106.

Right-Forward (RF): When the operator presses right foot pedal 128 in a forward direction (FIG. 1B), hydraulic fluid will flow from the RF port of pilot valve 304, through first directional control valve 310, to the RF port of distribution valve 330, past shuttle valve 334, and finally to the RF port of pilot signal manifold 340, which will command forward travel of the corresponding right traction device 108.

Left-Reverse (LR): When the operator presses left foot pedal 126 in a rearward direction (FIG. 1B), hydraulic fluid will flow from the LR port of pilot valve 304, through first directional control valve 310, to the LR port of distribution valve 330, past shuttle valve 336, and finally to the LR port of pilot signal manifold 340, which will command rearward travel of the corresponding left traction device 106.

Right-Reverse (RR): When the operator presses right foot pedal 128 in a rearward direction (FIG. 1B), hydraulic fluid will flow from the RR port of pilot valve 304, through first directional control valve 310, to the RR port of distribution valve 330, past shuttle valve 338, and finally to the port RR of pilot signal manifold 340, which will command rearward travel of the corresponding right traction device 108.

When steering input 124 is moved to the second, straight mode, switch 302 closes to energize first and second directional control valves 310, 320, which shifts first and second directional control valves 310, 320 into their second positions 314, 324, respectively (not shown in FIG. 3). First directional control valve 310 will now be closed to incoming fluid from pilot valve 304, while second directional control valve 320 will now be open to incoming fluid from certain ports of pilot valve 304. In FIG. 3, specifically, second directional control valve 320 will be open to incoming fluid from the RF and RR ports of pilot valve 304. The flow of hydraulic fluid through circuit 300 in the second, straight mode is described below based on the operator's movement of right foot pedal 128.

Straight-Forward (SF): When the operator presses right foot pedal 128 in a forward direction (FIG. 1B), hydraulic fluid will flow from the RF port of pilot valve 304, through second directional control valve 320, and to the SF port of distribution valve 330. In distribution valve 330, the fluid will be divided equally at point 350. A first portion of the fluid will flow past shuttle valve 332 to the LF port of pilot signal manifold 340, which will command forward travel of left traction device 106, and a second portion of the fluid will flow past shuttle valve 334 to the RF port of pilot signal manifold 340, which will command forward travel of right traction device 108. In this manner, left and right traction devices 106, 108, will travel forward together to drive vehicle 100 along a straight forward path.

Straight-Reverse (SR): When the operator presses right foot pedal 128 in a rearward direction (FIG. 1B), hydraulic fluid will flow from the RR port of pilot valve 304, through second directional control valve 320, and to the SR port of distribution valve 330. In distribution valve 330, the fluid will be divided equally at point 352. A first portion of the fluid will flow past shuttle valve 336 to the LR port of pilot signal manifold 340, which will command rearward travel of left traction device 106, and a second portion of the fluid will flow past shuttle valve 338 to the RR port of pilot signal manifold 340, which will command rearward travel of right traction device 108. In this manner, left and right traction devices 106, 108, will travel rearward together to drive vehicle 100 along a straight rearward path.

Hydraulic fluid leaving distribution valve 330 may be directed to tank 360. In the first, turning mode, with first and second directional control valves 310, 320 in their neutral positions 312, 322, respectively (as shown in FIG. 3), second directional control valve 320 will be open to hydraulic fluid from distribution valve 330 to direct the fluid to tank 360. In the second, straight mode, with first and second directional control valves 310, 320 in their second positions 314, 324, respectively (not shown in FIG. 3), first directional control valve 310 will be open to hydraulic fluid from distribution valve 330 to direct the fluid to tank 360.

Figure 4:
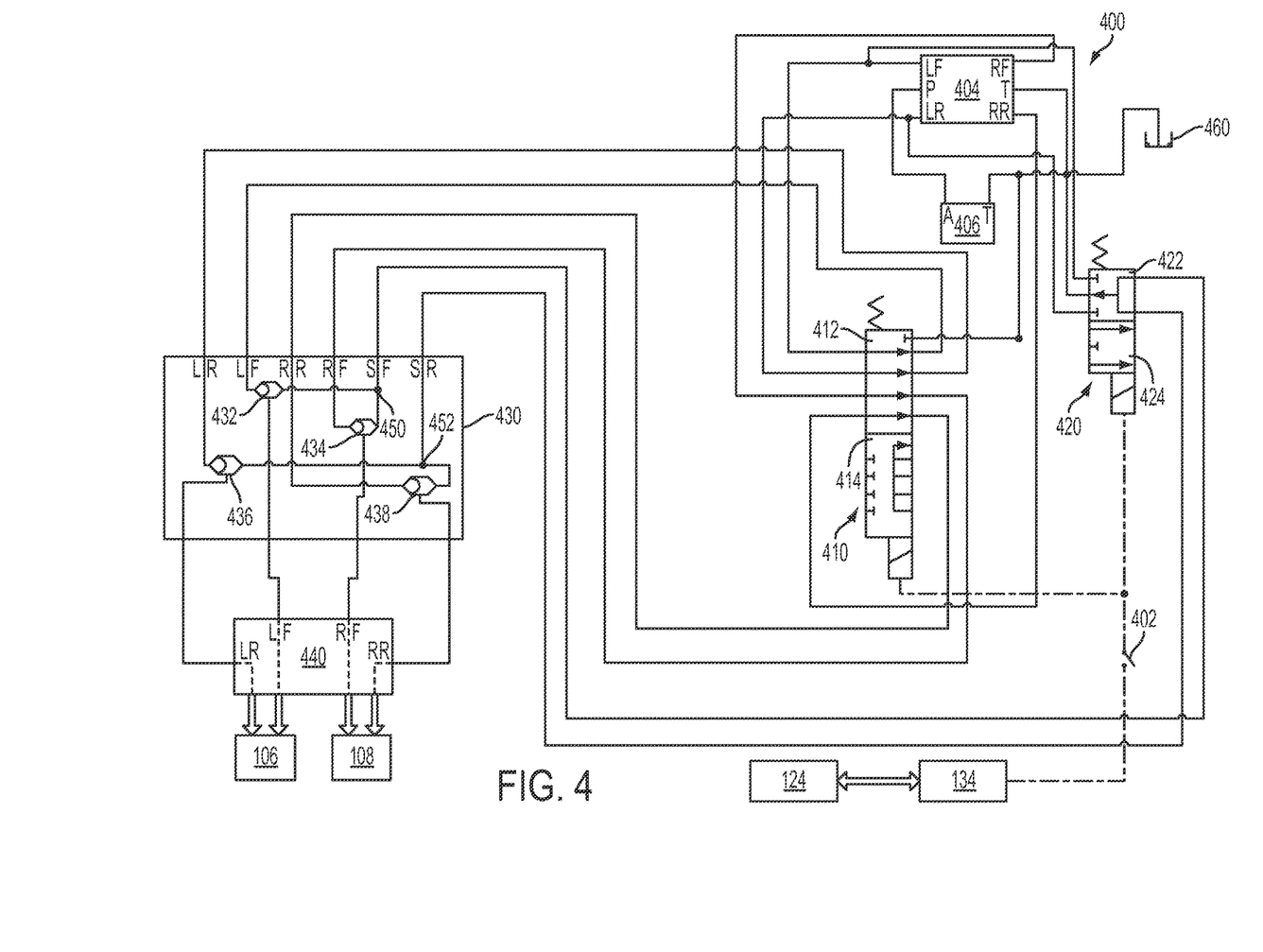
FIG. 4 is a schematic view of a second exemplary hydraulic circuit for operating the excavator of FIG. 1A.

Referring next to FIG. 4, a second exemplary hydraulic circuit 400 is provided to operate vehicle 100 (FIG. 1A). Circuit 400 of FIG. 4 is similar to circuit 300 of FIG. 3, with like reference numerals identifying like elements. Circuit 400 includes a steering mode switch 402, a pilot valve 404, a shut-off valve 406 in communication with pilot valve 404, a first directional control valve 410, a second directional control valve 420, a distribution valve 430, a pilot signal manifold 440 in communication with left and right traction devices 106, 108, and a tank 460.

In the first, turning mode, circuit 400 behaves the same as circuit 300. First directional control valve 410 will be open to incoming fluid from pilot valve 404, while second directional control valve 420 will be closed to incoming fluid from pilot valve 404. First directional control valve 410 will direct fluid from the LF, RF, LR, and RR ports of pilot valve 404 to the corresponding LF, RF, LR, and RR ports of distribution valve 430 and pilot signal manifold 440, and pilot signal manifold 440 will command appropriate travel of left and right traction devices 106, 108.

In the second, straight mode, first directional control valve 410 will be closed to incoming fluid from pilot valve 404, while second directional control valve 420 will be open to incoming fluid from certain ports of pilot valve 404. In FIG. 4, specifically, second directional control valve 420 will be open to incoming fluid from the LF and LR ports of pilot valve 404. In FIG. 3, by contrast, second directional control valve 320 was open to incoming fluid from the RF (not LF) and RR (not LR) ports of pilot valve 304, so the flow of hydraulic fluid was based on the operator's movement of right foot pedal 128. Here, in circuit 400 of FIG. 4, the flow of hydraulic fluid is based instead on the operator's movement of left foot pedal 126, as described below.

Straight-Forward (SF): When the operator presses left foot pedal 126 in a forward direction (FIG. 1B), hydraulic fluid will flow from the LF port of pilot valve 404, through second directional control valve 420, and to the SF port of distribution valve 430. In distribution valve 430, the fluid will be divided equally at point 450. A first portion of the fluid will flow past shuttle valve 432 to the LF port of pilot signal manifold 440, which will command forward travel of left traction device 106, and a second portion of the fluid will flow past shuttle valve 434 to the RF port of pilot signal manifold 440, which will command forward travel of right traction device 108. In this manner, left and right traction devices 106, 108, will travel forward together to drive vehicle 100 along a straight forward path.

Straight-Reverse (SR): When the operator presses left foot pedal 126 in a rearward direction (FIG. 1B), hydraulic fluid will flow from the LR port of pilot valve 404, through second directional control valve 420, and to the SR port of distribution valve 430. In distribution valve 430, the fluid will be divided equally at point 452. A first portion of the fluid will flow past shuttle valve 436 to the LR port of pilot signal manifold 440, which will command rearward travel of left traction device 106, and a second portion of the fluid will flow past shuttle valve 438 to the RR port of pilot signal manifold 440, which will command rearward travel of right traction device 108. In this manner, left and right traction devices 106, 108, will travel rearward together to drive vehicle 100 along a straight rearward path.

Figure 5:
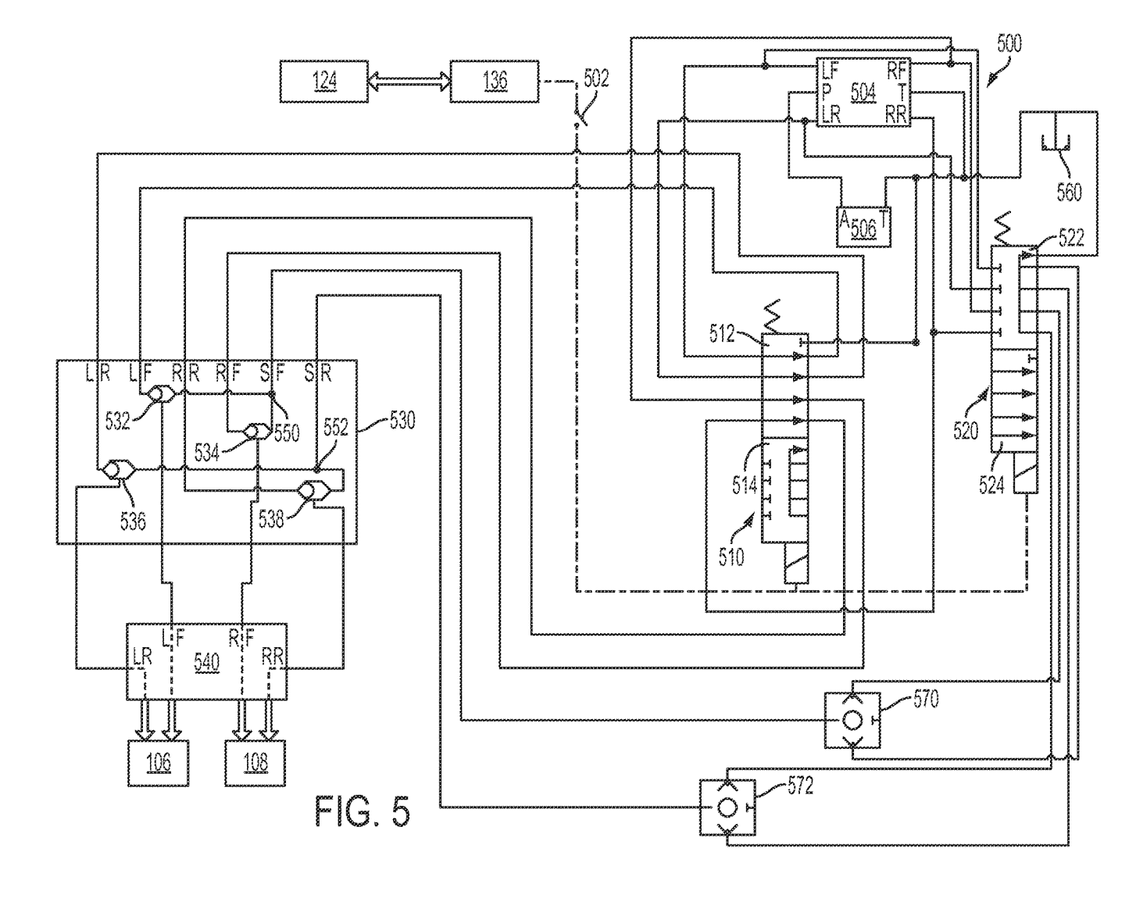
FIG. 5 is a schematic view of a third exemplary hydraulic circuit for operating the excavator of FIG. 1A.

Referring next to FIG. 5, a third exemplary hydraulic circuit 500 is provided to operate vehicle 100 (FIG. 1A). Circuit 500 of FIG. 5 is similar to circuit 300 of FIG. 3 and circuit 400 of FIG. 4, with like reference numerals identifying like elements. Circuit 500 includes a steering mode switch 502, a pilot valve 504, a shut-off valve 506 in communication with pilot valve 504, a first directional control valve 510, a second directional control valve 520, a distribution valve 530, a pilot signal manifold 540 in communication with left and right traction devices 106, 108, and a tank 560. Circuit 500 further includes first and second shuttle valves 570, 572 positioned along the fluid flow pathway between second directional control valve 520 and distribution valve 530.

In the first, turning mode, circuit 500 behaves the same as circuits 300, 400. First directional control valve 510 will be open to incoming fluid from pilot valve 504, while second directional control valve 520 will be closed to incoming fluid from pilot valve 504. First directional control valve 510 will direct fluid from the LF, RF, LR, and RR ports of pilot valve 504 to the corresponding LF, RF, LR, and RR ports of distribution valve 530 and pilot signal manifold 540, and pilot signal manifold 540 will command appropriate travel of left and right traction devices 106, 108.

In the second, straight mode, first directional control valve 510 will be closed to incoming fluid from pilot valve 504, while second directional control valve 520 will be open to incoming fluid from all four ports LF, RF, LR, and RR of pilot valve 404. In circuit 300 of FIG. 3, second directional control valve 320 was only open to incoming fluid from two ports RF and RR of pilot valve 304, so the flow of hydraulic fluid was based on the operator's movement of right foot pedal 128. In circuit 400 of FIG. 4, second directional control valve 420 was only open to fluid from two ports LF and LR of pilot valve 404, so the flow of hydraulic fluid was based on the operator's movement of left foot pedal 128. However, in the present circuit 500 of FIG. 5, the flow of hydraulic fluid is based on the operator's movement of left foot pedal 126 and/or right foot pedal 128, as described below.

Straight-Forward (SF): When the operator presses left foot pedal 126 and/or right foot pedal 128 in a forward direction (FIG. 1B), hydraulic fluid will flow from the corresponding LF port and/or RF port of pilot valve 504, through second directional control valve 520, and to first shuttle valve 570. Regardless of whether the fluid originated from the LF port and/or the RF port of pilot valve 504, the resulting fluid will continue to the SF port of distribution valve 530 and will be divided equally at point 550. A first portion of the fluid will flow past shuttle valve 532 to the LF port of pilot signal manifold 540, which will command forward travel of left traction device 106, and a second portion of the fluid will flow past shuttle valve 534 to the RF port of pilot signal manifold 540, which will command forward travel of right traction device 108. In this manner, left and right traction devices 106, 108, will travel forward together to drive vehicle 100 along a straight forward path.

Straight-Reverse (SR): When the operator presses left foot pedal 126 and/or right foot pedal 128 in a rearward direction (FIG. 1B), hydraulic fluid will flow from the corresponding LR port and/or RR port of pilot valve 504, through second directional control valve 520, and to second shuttle valve 572. Regardless of whether the fluid originated from the LR port and/or the RR port of pilot valve 504, the resulting fluid will continue to the SR port of distribution valve 530 and will be divided equally at point 552. A first portion of the fluid will flow past shuttle valve 536 to the LR port of pilot signal manifold 540, which will command rearward travel of left traction device 106, and a second portion of the fluid will flow past shuttle valve 538 to the RR port of pilot signal manifold 540, which will command rearward travel of right traction device 108. In this manner, left and right traction devices 106, 108, will travel rearward together to drive vehicle 100 along a straight rearward path.

Figure 6:
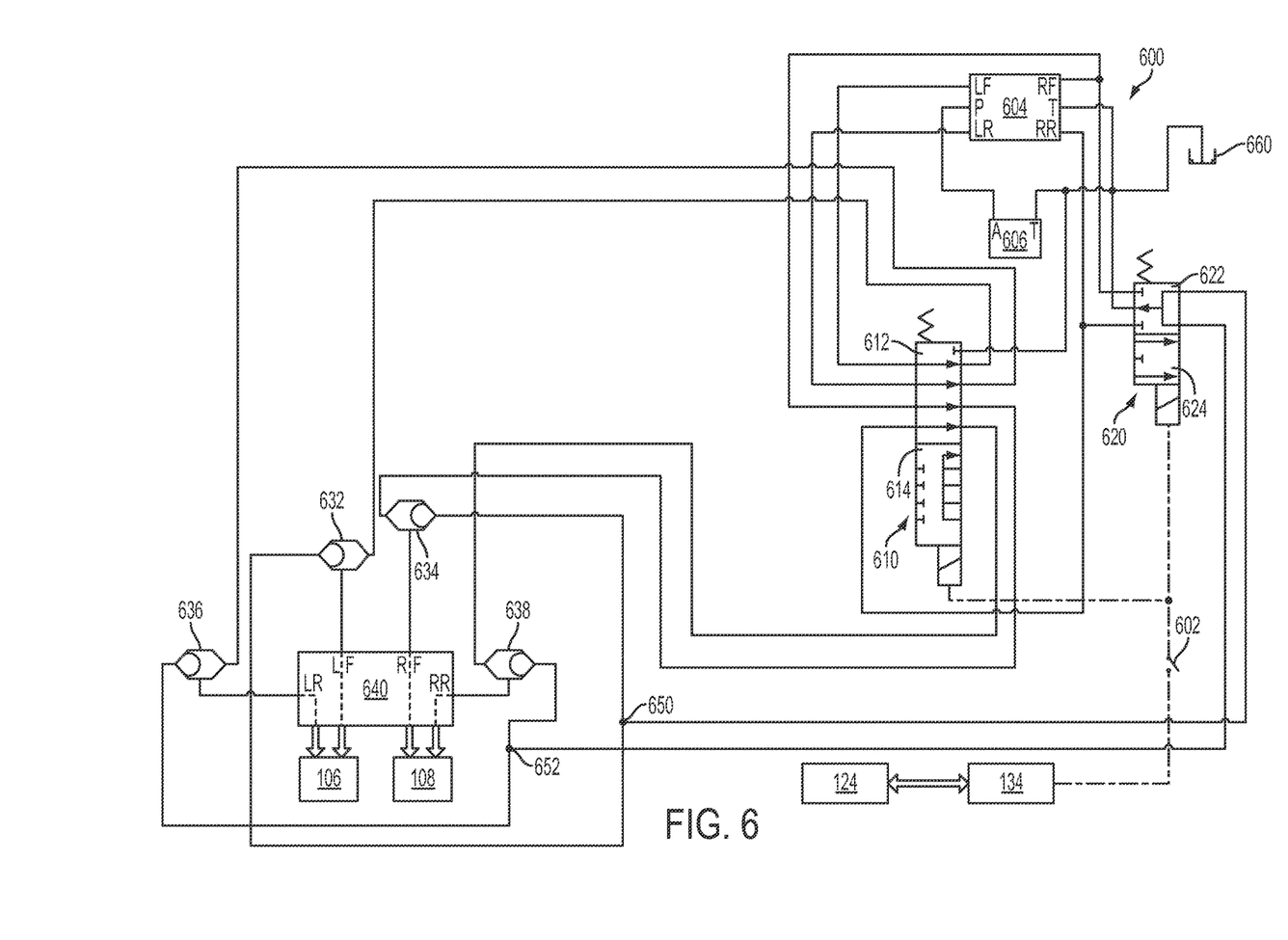
FIG. 6 is a schematic view of a fourth exemplary hydraulic circuit for operating the excavator of FIG. 1A.

Referring next to FIG. 6, a fourth exemplary hydraulic circuit 600 is provided to operate vehicle 100 (FIG. 1A). Circuit 600 of FIG. 6 is similar to circuit 300 of FIG. 3, circuit 400 of FIG. 4, and circuit 500 of FIG. 5, with like reference numerals identifying like elements. Circuit 600 includes a steering mode switch 602, a pilot valve 604, a shut-off valve 606 in communication with pilot valve 604, a first directional control valve 610, a second directional control valve 620, a pilot signal manifold 640 in communication with left and right traction devices 106, 108, and a tank 660. Circuit 600 lacks a distribution valve (See, e.g., distribution valve 330 of FIG. 3). However, circuit 600 still includes shuttle valves 632, 634, 636, 638 and flow division points 650, 652 similar to those found in the above-described distribution valves (See, e.g., shuttle valves 332, 334, 336, 338 and flow division points 350, 352 in distribution valve 330 of FIG. 3).

In the first, turning mode, circuit 600 behaves like circuits 300, 400, 500. First directional control valve 610 will be open to incoming fluid from pilot valve 604, while second directional control valve 620 will be closed to incoming fluid from pilot valve 604. First directional control valve 610 will direct fluid from the LF, RF, LR, and RR ports of pilot valve 604 to the corresponding LF, RF, LR, and RR ports of pilot signal manifold 640, which will command appropriate travel of left and right traction devices 106, 108.

In the second, straight mode, first directional control valve 610 will be closed to incoming fluid from pilot valve 604, while second directional control valve 620 will be open to incoming fluid from certain ports of pilot valve 604. In FIG. 6, specifically, second directional control valve 620 will be open to incoming fluid from the RF and RR ports of pilot valve 604. It is also within the scope of the present disclosure that second directional control valve 620 may be open to the LF and LR ports of pilot valve 604, instead of or in addition to the RF and RR ports of pilot valve 604. However, as illustrated, the flow of hydraulic fluid is based instead on the operator's movement of right foot pedal 128, as described below.

Straight-Forward (SF): When the operator presses right foot pedal 128 in a forward direction (FIG. 1B), hydraulic fluid will flow from the RF port of pilot valve 604 and through second directional control valve 620. The fluid will then be divided equally at point 650. A first portion of the fluid will flow past shuttle valve 632 to the LF port of pilot signal manifold 640, which will command forward travel of left traction device 106, and a second portion of the fluid will flow past shuttle valve 634 to the RF port of pilot signal manifold 640, which will command forward travel of right traction device 108. In this manner, left and right traction devices 106, 108, will travel forward together to drive vehicle 100 along a straight forward path.

Straight-Reverse (SR): When the operator presses right foot pedal 128 in a rearward direction (FIG. 1B), hydraulic fluid will flow from the RR port of pilot valve 604 and through second directional control valve 620. The fluid will then be divided equally at point 652. A first portion of the fluid will flow past shuttle valve 636 to the LR port of pilot signal manifold 640, which will command rearward travel of left traction device 106, and a second portion of the fluid will flow past shuttle valve 638 to the RR port of pilot signal manifold 640, which will command rearward travel of right traction device 108. In this manner, left and right traction devices 106, 108, will travel rearward together to drive vehicle 100 along a straight rearward path.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work vehicle that is selectively operable in a first steering mode and a second steering mode, the work vehicle comprising:
   a chassis;
   a first traction device supporting the chassis;
   a second traction device supporting the chassis;
   a first steering input device that is configured to control movement of the first traction device in the first steering mode; and
   a second steering input device configured to control movement of (i) the second traction device in the first steering mode and (ii) the first traction device and the second traction device in the second steering mode; and
   a controller configured to:
      cause the work vehicle to enter the first steering mode in response to detecting that a steering mode input device is in a first position;
      cause the work vehicle to enter the second steering mode in response to detecting that the steering mode input device is in a second position;
      when the steering mode input device is in the second position, detect a manipulation of the first steering input device; and
      in response to detecting the manipulation of the first steering input device when the steering mode input device is in the second position, cause the work vehicle to switch from the second steering mode to the first steering mode.

2. The work vehicle of claim 1, wherein the first traction device is configured to move independently of the second traction device in the first steering mode.

3. The work vehicle of claim 2, wherein the first traction device is configured to move faster than the second traction device in the first steering mode to turn the work vehicle right or left.

4. The work vehicle of claim 1, wherein the first traction device is configured to move together with the second traction device in the second steering mode to steer the work vehicle straight.

5. The work vehicle of claim 1, wherein the first steering input device is configured to be disconnected from the first traction device and the second traction device in the second steering mode.

6. The work vehicle of claim 5, wherein the first steering input device and the second steering input device comprise foot pedals.

7. The work vehicle of claim 1, further comprising the steering mode input device for switching between the first steering mode and the second steering mode.

8. The work vehicle of claim 1, further comprising a hydraulic circuit operatively coupled to the first traction device and the second traction device, the hydraulic circuit configured to divide a supply of a hydraulic fluid equally between the first traction device and the second traction device in the second steering mode.

9. The work vehicle of claim 8, wherein the hydraulic circuit comprises:
a first directional control valve that is configured to direct the hydraulic fluid to drive the first traction device and the second traction device in the first steering mode; and
a second directional control valve that is configured to direct the hydraulic fluid to drive the first traction device and the second traction device in the second steering mode.

10. The work vehicle of claim 9, wherein:
the first directional control valve is configured to direct the hydraulic fluid to a tank in the second steering mode; and
the second directional control valve is configured to direct the hydraulic fluid to the tank in the first steering mode.

11. A work vehicle including:
a chassis;
at least one left traction device supporting the chassis;
at least one right traction device supporting the chassis;
a left steering input device;
a right steering input device;
a mode selector operable to switch between a first steering mode and a second steering mode, wherein:
in the first steering mode, the at least one left traction device is configured to be operated by the left steering input device and the at least one right traction device is configured to be operated by the right steering input device to steer the work vehicle left, right, or straight, and
in the second steering mode, the at least one left traction device and the at least one right traction device are configured to be operated together by the left steering input device to steer the work vehicle straight; and
a controller configured to:
cause the work vehicle to enter the first steering mode in response to detecting that the mode selector is in a first position;
cause the work vehicle to enter the second steering mode in response to detecting that the mode selector is in a second position;
when the steering mode input device is in the second position, detect a manipulation of the right steering input device; and
in response to detecting the manipulation of the right steering input device when the steering mode input device is in the second position, cause the work vehicle to switch from the second steering mode to the first steering mode.

12. The work vehicle of claim 11, wherein the left steering input device includes a left foot pedal and the right steering input device includes a right foot pedal.

13. The work vehicle of claim 12, wherein the work vehicle lacks a third foot pedal operatively coupled to either of the at least one left traction device and the at least one right traction device.

14. A method comprising:
causing, by a controller, a work vehicle to enter a first steering mode in response to detecting that a mode selector input is in a first position, wherein the work vehicle is configured to control a first traction device and a second traction device together in response to manipulation of a first steering input device when in the first steering mode;
detecting, by the controller and when the mode selector input is in the first position, a manipulation of a second steering input device; and
in response to detecting the manipulation of the second steering input device when the steering mode input is in the first position, causing, by the controller, the work vehicle to switch from the first steering mode to a second steering mode in which the work vehicle is configured to control the first traction device in response to manipulation of the first steering input device and control the second traction device in response to manipulation of the second steering input device.

15. The method of claim 14, further comprising equally dividing a supply of hydraulic fluid between the first traction device and the second traction device to steer the work vehicle straight.

16. The method of claim 14, further comprising causing the work vehicle to enter the second steering mode in response to detecting that the mode selector input is in a second position.

17. The method of claim 14, wherein the second steering input device is disconnected from the first traction device and the second traction device while the work vehicle is in the first steering mode.

* * * * *